United States Patent
Zhang

(10) Patent No.: US 9,444,208 B2
(45) Date of Patent: Sep. 13, 2016

(54) COMPATIBLE DEVICE FOR SIM CARD AND RELATED TERMINAL

(71) Applicant: ZTE Corporation, Shenzhen (CN)

(72) Inventor: Xiaofang Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/435,543

(22) PCT Filed: Aug. 15, 2013

(86) PCT No.: PCT/CN2013/081529
§ 371 (c)(1),
(2) Date: Apr. 14, 2015

(87) PCT Pub. No.: WO2014/059818
PCT Pub. Date: Apr. 24, 2014

(65) Prior Publication Data
US 2015/0270670 A1    Sep. 24, 2015

(30) Foreign Application Priority Data
Oct. 15, 2012   (CN) ..................... 2012 2 0526410 U

(51) Int. Cl.
H01R 24/00 (2011.01)
H01R 31/06 (2006.01)
G06K 7/00 (2006.01)
H01R 27/00 (2006.01)
H01R 12/72 (2011.01)

(52) U.S. Cl.
CPC ............. *H01R 31/06* (2013.01); *G06K 7/0073* (2013.01); *H01R 12/721* (2013.01); *H01R 27/00* (2013.01)

(58) Field of Classification Search
CPC .... H01R 31/06; H01R 27/00; H01R 12/721; G06K 7/0073

USPC .................. 439/631, 630, 326, 632; 235/441
See application file for complete search history.

(56) References Cited

U.S. PATENT DOCUMENTS 6,398,572 B1 * 6/2002 Larsson ............... G06K 7/0021
439/327

FOREIGN PATENT DOCUMENTS

| CN | 201937141 U | 8/2011 |
| CN | 202004187 U | 10/2011 |
| CN | 202840165 U | 3/2013 |
| EP | 0556970 A1 | 8/1993 |
| WO | 2009118807 A1 | 10/2009 |

OTHER PUBLICATIONS

Machine translation CN 202004187 dated Dec. 28, 2015.*
Supplementary European Search Report of European Application No. 13846654, dated Sep. 9, 2015.
International Search Report of PCT/CN2013/081529, dated Oct. 10, 2013.

* cited by examiner

*Primary Examiner* — Javaid Nasri
(74) *Attorney, Agent, or Firm* — Banner & Witcoff, Ltd.

(57) ABSTRACT

A compatible apparatus for an SIM card and a related terminal are disclosed. The compatible apparatus includes: a second card slot and a first card slot rotatably connected to the second card slot; wherein a card insertion area with parallel metal elastic pins is arranged in the second card slot; a first SIM card is inserted into fillets on both sides of the first card slot, and when the first card slot is snapped on the second card slot, the first SIM card contacts with the metal elastic pins; and an elastic stop apparatus matched with a second SIM card is arranged outside of the card insertion area in the second card slot, the elastic stop apparatus is for arranging the second SIM card, and when the first card slot is snapped on the second card slot, the second SIM card contacts with the metal elastic pins.

8 Claims, 2 Drawing Sheets

COMPATIBLE DEVICE FOR SIM CARD AND RELATED TERMINAL

TECHNICAL FIELD

The present document relates to the field of communication technologies, and in particular, to a compatible apparatus for an SIM card and a related terminal.

BACKGROUND

The SIM card is also referred to as a smart card, or a user identity card, and a digital mobile terminal must be installed with the card for use. The SIM card stores contents such as information of clients of digital mobile telephones, encrypted keys, and telephone books of users etc. on a computer chip, for use by the GSM network to authenticate identities of clients, and encrypt the voice information during a call of the client.

With the development of mobile communications, different companies design SIM cards with different sizes, for example, an ordinary SIM card and a Micro SIM card etc., so that users will not easily change cards, so as to lock more users. However, due to different sizes of the SIM cards, requirements for user experiences are limited.

SUMMARY

In view of the above analysis, the embodiments of the present document aim to provide a compatible apparatus for an SIM card and a related terminal, to solve the problem in the prior art that SIM cards with different sizes cannot be placed on the same terminal.

The purpose of the embodiments of the present document is primarily implemented by the following technical solutions:

A compatible apparatus for an SIM card, comprising a second card slot and a first card slot rotatably connected to the second card slot;

wherein a card insertion area is arranged in the second card slot, and the card insertion area has a plurality of parallel metal elastic pins provided therein; and an elastic stop apparatus matched with a second SIM card in shape is arranged on the outside of the card insertion area in the second card slot, and the elastic stop apparatus is used for fixing the second SIM card.

Preferably, a first SIM card is inserted into fillets on both sides of the first card slot, and when the first card slot is snapped on the second card slot, the first SIM card is in contact with the metal elastic pins; and when the first card slot is snapped on the second card slot, the second SIM card is in contact with the metal elastic pins.

Preferably, the elastic stop apparatus comprises two groove-shape elastic stop sheets, which are a first elastic stop sheet and a second elastic stop sheet respectively; a slot opening of the first elastic stop sheet is disposed opposite to a slot opening of the second elastic stop sheet; a slot bottom of the first elastic stop sheet and a slot bottom of the second elastic stop sheet are arranged on both sides of the card insertion area perpendicular to a direction of the metal elastic pins respectively; and a slot sidewall of the first elastic stop sheet and a slot sidewall of the second elastic stop sheet are arranged on both sides of the card insertion area parallel to a direction of the metal elastic pins respectively.

Preferably, the elastic stop apparatus comprises two groove-shape elastic stop sheets, which are a first elastic stop sheet and a second elastic stop sheet respectively; a slot opening of the first elastic stop sheet is disposed opposite to a slot opening of the second elastic stop sheet; a slot bottom of the first elastic stop sheet and a slot bottom of the second elastic stop sheet are arranged on both sides of the card insertion area parallel to a direction of the metal elastic pins respectively; and a slot sidewall of the first elastic stop sheet and a slot sidewall of the second elastic stop sheet are arranged on both sides of the card insertion area perpendicular to a direction of the metal elastic pins respectively.

Preferably, an inner angle of a slot bottom of the first elastic stop sheet or a slot bottom of the second elastic stop sheet has a triangular filling part arranged therein, the filling part matching with a triangular notch of the second SIM card.

Preferably, the fillets are perpendicular to a connection side between the first card slot and the second card slot.

Preferably, the elastic stop apparatus has a thickness equal to that of the second SIM card.

Preferably, the first card slot is connected to the second card slot with a slide rail.

Preferably, the second SIM card comprises a Micro SIM card, a Nano SIM card, or a Mini SIM card.

Preferably, the first SIM card has a length and a width larger than those of the second SIM card.

The present document further comprises a terminal, at least comprising the compatible apparatus for an SIM card according to any of the above claims.

The beneficial effects of the embodiments of the present document are as follows.

The embodiments of the present document provide a compatible apparatus for an SIM card and a related terminal, wherein an elastic stop apparatus is arranged on the outside of the card insertion area, the second SIM card is fixed by the stop apparatus, and the first SIM card is fixed with fillets on both sides of the first card slot. Therefore, with the compatible apparatus for an SIM card, installation of the first SIM card and the second SIM card on one terminal can be achieved, thereby better meeting the requirements for different user experiences.

Other features and advantages of the embodiments of the present document will be set forth in the description that follows. In addition, a part of the features and advantages are obvious from the description or are understood by implementation of embodiments of the present document. The purposes and other advantages of the embodiments of the present document can be implemented and obtained through the structures which are particularly pointed out in the description, claims, and accompanying drawings which are drafted.

reference numbers: 1—first card slot, 2—second card slot, 3—card insertion area, 4—metal elastic pin, 51—first elastic stop sheet, 52—second elastic stop sheet, 511—slot opening, 512—slot bottom, 513—slot sidewall, 514—filling part, 521—slot opening, 522—slot bottom, 523—slot sidewall, 6—slide rail, 7—triangular notch, 8—second SIM card, 9≙first SIM card.

PREFERRED EMBODIMENTS OF THE PRESENT DOCUMENT

The preferable embodiments of the present document will be described in detail below in conjunction with accompanying drawings. Wherein, the accompanying drawings constitute a part of the present application, and are used to set forth the principle of the present document together with the embodiments of the present document. For purposes of clarity and simplification, specific description of the known functions and structures in the devices described herein will be omitted when they may make the subject matter of the present document obscure.

Embodiment One

Figure 1:
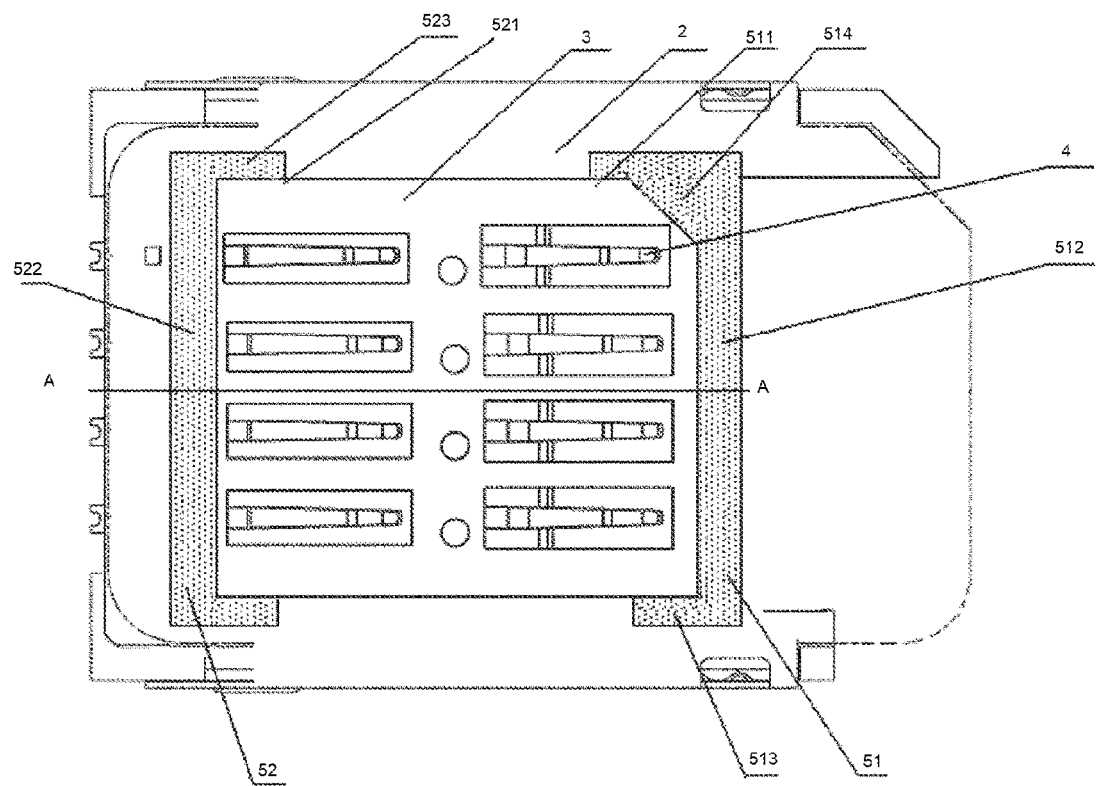
FIG. 1 is a top view of a compatible apparatus for an SIM card according to embodiment one of the present document.
Figure 2:
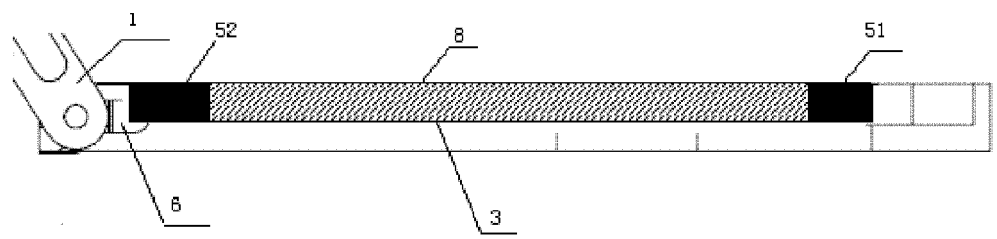
FIG. 2 is a section view of the compatible apparatus for an SIM card according to the embodiment one of the present document along an A-A line.
Figure 3:
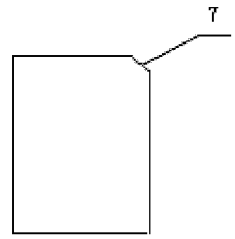
FIG. 3 is a diagram of an SIM card according to the embodiment one of the present document.

The embodiments of the present document provide a compatible apparatus for an SIM card, with reference to FIGS. 1-3, comprising:

a second card slot 2 and a first card slot 1 rotatably connected to the second card slot 2, wherein the first card slot 1 is connected to the second card slot 2 with a slide rail 6. A card insertion area 3 is arranged in the second card slot 2, and the card insertion area 3 has a plurality of parallel metal elastic pins 4 provided therein; wherein, an elastic stop apparatus matched with a second SIM card 8 in shape is arranged on the outside of the card insertion area 3 in the second card slot 2, and the elastic stop apparatus is used for fixing the second SIM card 8. When the first card slot 1 is snapped on the second card slot 2, the second SIM card 8 is in contact with the metal elastic pins 4. The elastic stop apparatus has a thickness equal to that of the second SIM card 8.

Wherein, the first SIM card has a length and a width larger than those of the second SIM card. The first SIM card is an ordinary SIM card, and the second SIM card 8 comprises a Micro SIM card, a Nano SIM card, or a Mini SIM card. In addition, the elastic stop apparatus may also be set in a particular shape according to actual requirements of the SIM card.

As shown in FIG. 2, the elastic stop apparatus comprises two groove-shape elastic stop sheets, which are a first groove-shape elastic stop sheet 51 and a second groove-shape elastic stop sheet 52 respectively; a slot opening 511 of the first elastic stop sheet 51 is disposed opposite to a slot opening 521 of the second elastic stop sheet 52; a slot bottom 512 of the first elastic stop sheet 51 and a slot bottom 522 of the second elastic stop sheet 52 are arranged on both sides of the card insertion area 3 perpendicular to a direction of the metal elastic pins 4 respectively; and a slot sidewall 513 of the first elastic stop sheet 51 and a slot sidewall 523 of the second elastic stop sheet 52 are arranged on both sides of the card insertion area 3 parallel to a direction of the metal elastic pins 4 respectively.

Alternatively, a slot bottom 512 of the first elastic stop sheet 51 and a slot bottom 522 of the second elastic stop sheet 52 may further be arranged on both sides of the card insertion area 3 parallel to a direction of the metal elastic pins 4 respectively; and a slot sidewall 513 of the first elastic stop sheet 51 and a slot sidewall 523 of the second elastic stop sheet 52 are arranged on both sides of the card insertion area 3 perpendicular to a direction of the metal elastic pins 4 respectively.

An inner angle of a slot bottom 512 of the first elastic stop sheet 51 has a triangular filling part 514 arranged therein, the filling part 514 matching with a triangular notch 7 of the second SIM card 8, and the triangular notch 7 is specifically shown in FIG. 3.

The elastic stop apparatus may also be set as a whole, i.e., the first elastic stop sheet 51 and the second elastic stop sheet 52 are connected as a whole.

A first SIM card 9 is inserted into fillets on both sides of the first card slot 1. The fillets are perpendicular to a connection side between the first card slot 1 and the second card slot 2. When the first card slot 1 is snapped on the second card slot 2, the first card slot 1 is pressed on the elastic stop apparatus, and the first SIM card 9 is in contact with the metal elastic pins 4.

The embodiments of the present document provide a compatible apparatus for an SIM card, an elastic stop apparatus of the second SIM card 8 is arranged on the outside of the card insertion area 3, the first SIM card 9 is inserted into fillets on both sides of the first card slot 1, and when the first card slot 1 is snapped on the second card slot 2, the second SIM card 8 or the first SIM card 9 is in contact with the metal elastic pins 4. Therefore, with the apparatus, installation of the first SIM card and the second SIM card on one terminal can be achieved, thereby better meeting the requirements for different user experiences.

Embodiment Two

Figure 4:
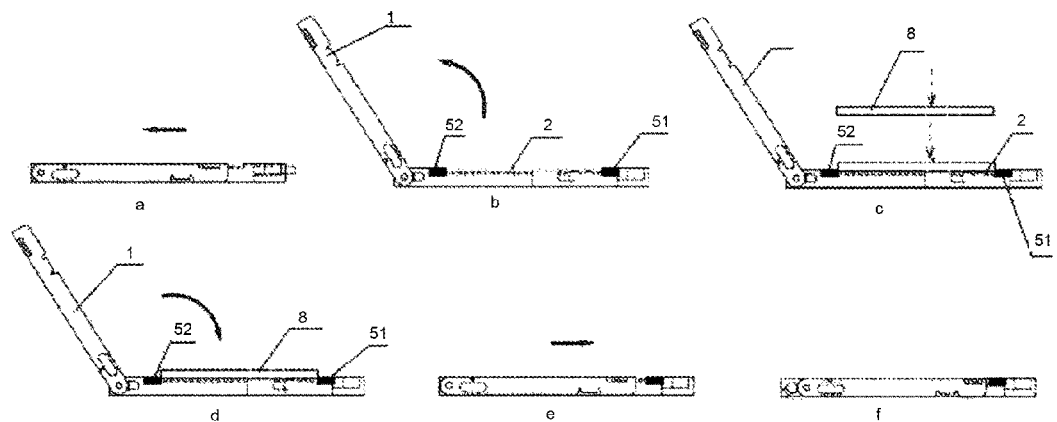
FIG. 4 is a diagram of an operation of placing a second SIM card in a compatible apparatus for an SIM card according to embodiment two of the present document.

The embodiments of the present document provide a compatible apparatus for an SIM card, which can be compatible with a second SIM card 8 and a first SIM card 9, and the step of placing the first SIM card 9 into the apparatus comprises: pushing the first card slot 1 to the slide rail side, rotating the first card slot 1, inserting the first SIM card 9 into the first card slot 1, closing the first card slot 1, pushing the first card slot 1 in a direction away from the slide rail 6, and compressing the elastic stop apparatus by the first card slot 1, so that the first SIM card 9 is in contact with the metal elastic pins 4, and the specific operations are as shown in FIG. 4.

Figure 5:
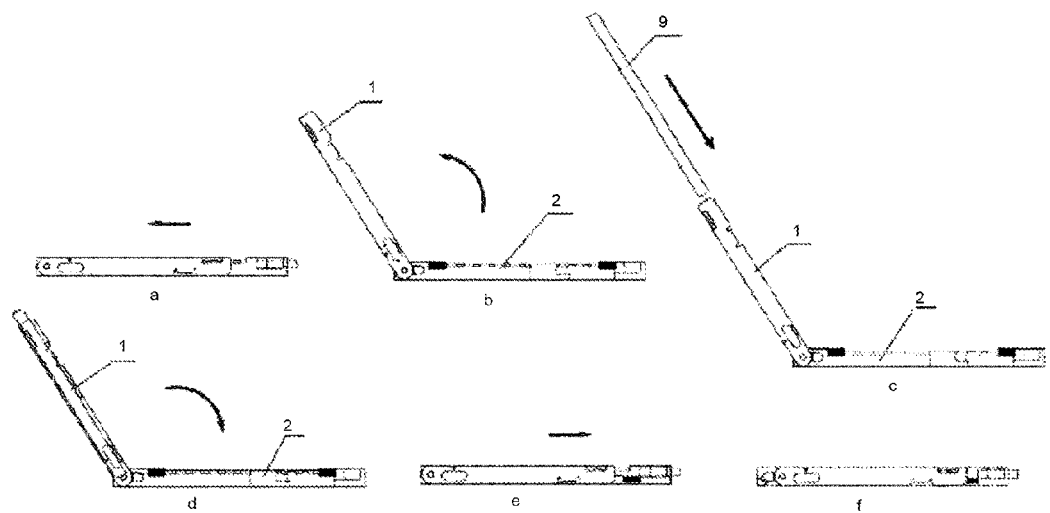
FIG. 5 is a diagram of an operation of placing a first SIM card in a compatible apparatus for an SIM card according to the embodiment two of the present document.

The step of installing the second SIM card 8 into the apparatus comprises: pushing the first card slot 1 to the slide rail 6 side, rotating the first card slot 1, placing the second SIM card 8 into the elastic stop apparatus, closing the first card slot 1, pushing the first card slot 1 in a direction away from the slide rail 6, and compressing the elastic stop apparatus by the first card slot 1, so that the second SIM card 8 is in contact with the metal elastic pins 4, and the specific operations are as shown in FIG. 5.

Embodiment Three

The embodiments of the present document provide a terminal, comprising a compatible apparatus for an SIM card according to any of the above embodiments.

In conclusion, the embodiments of the present document provide a compatible apparatus for an SIM card and a related terminal. The apparatus comprises an elastic stop apparatus arranged on the outside of the card insertion area, the second SIM card is fixed by the stop apparatus, and the first SIM card is fixed through fillets on the first card slot. Therefore, with the apparatus, installation of the first SIM card and the second SIM card on one terminal can be achieved, thereby better meeting the requirements for different user experiences.

The above description is merely specific embodiments of the present document. However, the protection scope of the present document is not limited thereto. Changes or substitutions can easily be reached by a person having ordinary skill in the art within the technical scope disclosed by the present document, and should be included in the protection scope of the present document. Therefore, the protection scope of the present document is defined by the protection scope of the claims.

INDUSTRIAL APPLICABILITY

The beneficial effects of the embodiments of the present document are as follows.

The embodiments of the present document provide a compatible apparatus for an SIM card and a related terminal, wherein an elastic stop apparatus is arranged on the outside of the card insertion area, the second SIM card is fixed by the stop apparatus, and the first SIM card is fixed with fillets on both sides of the first card slot. Therefore, with the compatible apparatus for an SIM card, installation of the first SIM card and the second SIM card on one terminal can be achieved, thereby better meeting the requirements for different user experiences.

What is claimed is:

1. A compatible apparatus for a SIM card, comprising a first card slot and a second card slot and a first SIM card or a second SIM card, wherein a first card slot is rotatably connected to the second card slot, the first SIM card has a length and a width larger than those of the second SIM card and the second SIM card comprises a Micro SIM card, a Nano SIM card, or a Mini SIM card;

wherein a card insertion area is arranged in the second card slot, and the card insertion area has a plurality of parallel metal elastic pins provided therein; and an elastic stop apparatus matched with the second SIM card in shape is arranged on the outside of the card insertion area in the second card slot, and the elastic stop apparatus is used for fixing the second SIM card, wherein the elastic stop apparatus comprises two groove-shape elastic stop sheets, which are a first elastic stop sheet and a second elastic stop sheet respectively;

a slot opening of the first elastic stop sheet is disposed opposite to a slot opening of the second elastic stop sheet;

a slot bottom of the first elastic stop sheet and a slot bottom of the second elastic stop sheet are arranged on both sides of the card insertion area perpendicular to a direction of the metal elastic pins respectively; and a slot sidewall of the first elastic stop sheet and a slot sidewall of the second elastic stop sheet are arranged on both sides of the card insertion area parallel to a direction of the metal elastic pins respectively; alternatively, a slot bottom of the first elastic stop sheet and a slot bottom of the second elastic stop sheet are arranged on both sides of the card insertion area parallel to a direction of the metal elastic pins respectively; and a slot sidewall of the first elastic stop sheet and a slot sidewall of the second elastic stop sheet are arranged on both sides of the card insertion area perpendicular to a direction of the metal elastic pins respectively.

2. The apparatus according to claim 1, wherein, a first SIM card is inserted into fillets on both sides of the first card slot, and when the first card slot is snapped on the second card slot, the first SIM card is in contact with the metal elastic pins; and when the first card slot is snapped on the second card slot, the second SIM card is in contact with the metal elastic pins.

3. The apparatus according to claim 2, wherein, one inner angle of a slot bottom of the first elastic stop sheet or a slot bottom of the second elastic stop sheet has a triangular filling part arranged therein, the filling part matching with a triangular notch of the second SIM card.

4. The apparatus according to claim 2, wherein, the fillets are perpendicular to a connection side between the first card slot and the second card slot.

5. The apparatus according to claim 2, wherein, the elastic stop apparatus has a thickness equal to that of the second SIM card.

6. The apparatus according to claim 1, wherein, one inner angle of the slot bottom of the first elastic stop sheet or the slot bottom of the second elastic stop sheet has a triangular filling part arranged therein, the filling part matching with a triangular notch of the second SIM card.

7. The apparatus according to claim 1, wherein, the elastic stop apparatus has a thickness equal to that of the second SIM card.

8. A terminal, comprising at least the compatible apparatus for the SIM card according to claim 1.

* * * * *